United States Patent
Brandt et al.

(10) Patent No.: US 7,954,621 B2
(45) Date of Patent: Jun. 7, 2011

(54) MODULAR WIRELESS CONVEYOR INTERCONNECTION METHOD AND SYSTEM

(75) Inventors: David Dale Brandt, New Berlin, WI (US); Wayne H. Wielebski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 726 days.

(21) Appl. No.: 11/863,125

(22) Filed: Sep. 27, 2007

(65) Prior Publication Data

US 2009/0084657 A1    Apr. 2, 2009

(51) Int. Cl.
*B65G 43/00* (2006.01)

(52) U.S. Cl. ............ 198/341.01; 198/349; 198/575

(58) Field of Classification Search ............ 198/341.01, 198/349, 575, 781.06
See application file for complete search history.

(56) References Cited

U.S. PATENT DOCUMENTS

| | | | |
|---|---|---|---|
| 7,280,889 B2 | 10/2007 | Knepple | |
| 2003/0116408 A1* | 6/2003 | Topmiller et al. | 198/781.05 |
| 2008/0198016 A1* | 8/2008 | Lawrence et al. | 340/572.4 |

OTHER PUBLICATIONS http://www.moxa.com/Zones/Wireless_Ethernet/Typical_Applications/Conveyor_Belts.htm.
Cooper Invision, "Reduce Downtime for Increased Productivity" Brochure No. 7024 01-07-5M.
http://www.insightsutomation.cc/documents/_conveynet_sheet.pdf.
http://www.humphrey-products.com/hpwpc.nsf/75D0EF5724FFDF0385256EBC00551CD7/%5C$file/GEN2%20Flier.pdf.
http://wireless.industrial-networking.com/articles/articledisplay.asp?id=223.
K. Koumpis; "Wireless Industrial Control and Monitoring beyong Cable Replacement," Jun. 2005; http://www.dcs.shef.ac.uk/~costis/pubs/pdf/profibus05.pdf.
http://domino.automation.rockwell.com/applications/css_artilce.nsf/a13c8bbec95a91d386256a77004832ab/5fc5544e46d118625718c0067d205?OpenDocument.

* cited by examiner

*Primary Examiner* — Mark A Deuble
(74) *Attorney, Agent, or Firm* — Fletcher Yoder LLP; William R. Walburn; John M. Miller (57) ABSTRACT

A modular conveyor system is disclosed in which components of each conveyor module is designed for wireless mesh communication. The communications may be within a module or between modules. Certain of the components may be powered by battery, such that the components may be completely wireless. The network may be entirely self-configuring such that the modules may be assembled and the network established in a straightforward manner.

9 Claims, 8 Drawing Sheets

MODULAR WIRELESS CONVEYOR INTERCONNECTION METHOD AND SYSTEM

BACKGROUND

The invention relates generally to communication across components in a conveyor system. More particularly, the invention relates to a technique for wireless mesh communication interconnecting components of a modular conveyor system.

Automation in manufacturing, shipping, and other applications often involves moving materials from one specialized work cell to another or to a final destination. Fixed material handling systems, such as conveyors, may route materials between cells. To facilitate the deployment of a fixed conveyor system, a system designer may purchase a conveyor system in multiple parts, known as "modules," to be assembled on site. With the proper application of modules, a modular conveyor system can sort, manipulate, measure, and move materials between locations.

Each module of a modular conveyor system generally communicates with surrounding modules and a supervisory system. A module may communicate with an adjacent module to coordinate material movement to or from the adjacent module. Additionally, many material handling decisions may require a module to collect other information first from a supervisory system before executing the decision. A module may also communicate with a supervisory system to report a conveyor jam or to download a reconfiguration command.

Legacy communication schemes run discrete wires or cables from each module directly to a central controller and supervisory system. More recent communication schemes seek to avoid prohibitively expensive, complicated cabling by employing module-to-module wired communication. However, such a daisy-chain strategy often leads to extended repair cycles when a fault occurs in the cabling.

To avoid cabled communication in conveyor systems, wireless communication has been employed in a limited manner. As recently implemented, however, wireless communication schemes have relied either upon access point infrastructure or simple point-to-point connections for certain communications. However such solutions do not support a complete and truly modular wireless conveyor system topology, but instead support limited function including supervisory system connection, wireless operator controls, and diagnostic sensing. Moreover, if communication in a modular conveyor system were based on access point infrastructure the cost would be higher and the system would not be self-contained. If communication were based on simple point-to-point connections, the system would not be robust against communication disruptions.

BRIEF DESCRIPTION

The invention includes a system and method for interconnecting a modular conveyor system using wireless mesh communication. In accordance with an aspect of the invention, a modular conveyor system may comprise a plurality of conveyor modules with wireless mesh communication points configured to communicate wirelessly over a mesh network. The plurality of wireless mesh communication points may automatically form an ad hoc wireless mesh network to route communication from component to component. Additionally, the modular conveyor system may comprise a supervisory system, battery-powered pushbutton stations, indicator lights, and/or a handheld conveyor system control device, each of which may be configured to communicate wirelessly with one another over the mesh network.

In accordance with another aspect of the invention, a conveyor module for a modular conveyor system may comprise a conveyor, a motor to move the conveyor, a motor controller to drive the motor, and a mote configured to enable the motor to communicate with another device over a wireless mesh network. The motor controller may be configured to communicate with a motor controller of an adjacent conveyor module. Additionally, the mote may be configured to communicate via an alternate path over the wireless mesh network when a direct path to the motor controller of the adjacent conveyor module is obstructed. As used herein, a "mote" is intended to mean a low power wireless mesh communication device that may be separate from or integrated into a wireless networkable component of a conveyor system or module.

Moreover, a technique for associating a conveyor module to a modular conveyor system is included. In accordance with another aspect of the invention, when a button is pressed on a pushbutton station disposed on or associated with a conveyor module, a conveyor module listens for a signal over the wireless mesh network from an upline conveyor module. The conveyor module then receives a signal from the upline conveyor module announcing the presence of the upline conveyor module, and sends a signal over the wireless mesh network to the upline conveyor module announcing the presence of the conveyor module. The conveyor module may additionally listen for a signal over the wireless mesh network from a downline conveyor module, receive a signal from the downline conveyor module announcing the presence of the downline conveyor module, and thereafter send a signal over the wireless mesh network to the downline conveyor module announcing the presence of the conveyor module.

Furthermore, another technique for associating a conveyor module to a modular conveyor system is also included. In accordance with another aspect of the invention, a wireless mesh network is established across components of a modular conveyor system. Once a conveyor module is connected to a computer system over the wireless mesh network, the conveyor module downloads association information from the computer system to associate the conveyor module to the modular conveyor system. Additionally or alternatively, the conveyor module may send the computer system a serial number of the conveyor module, or may determine its location relative to other wireless mesh components and send the relative location information to the computer system before downloading association information.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
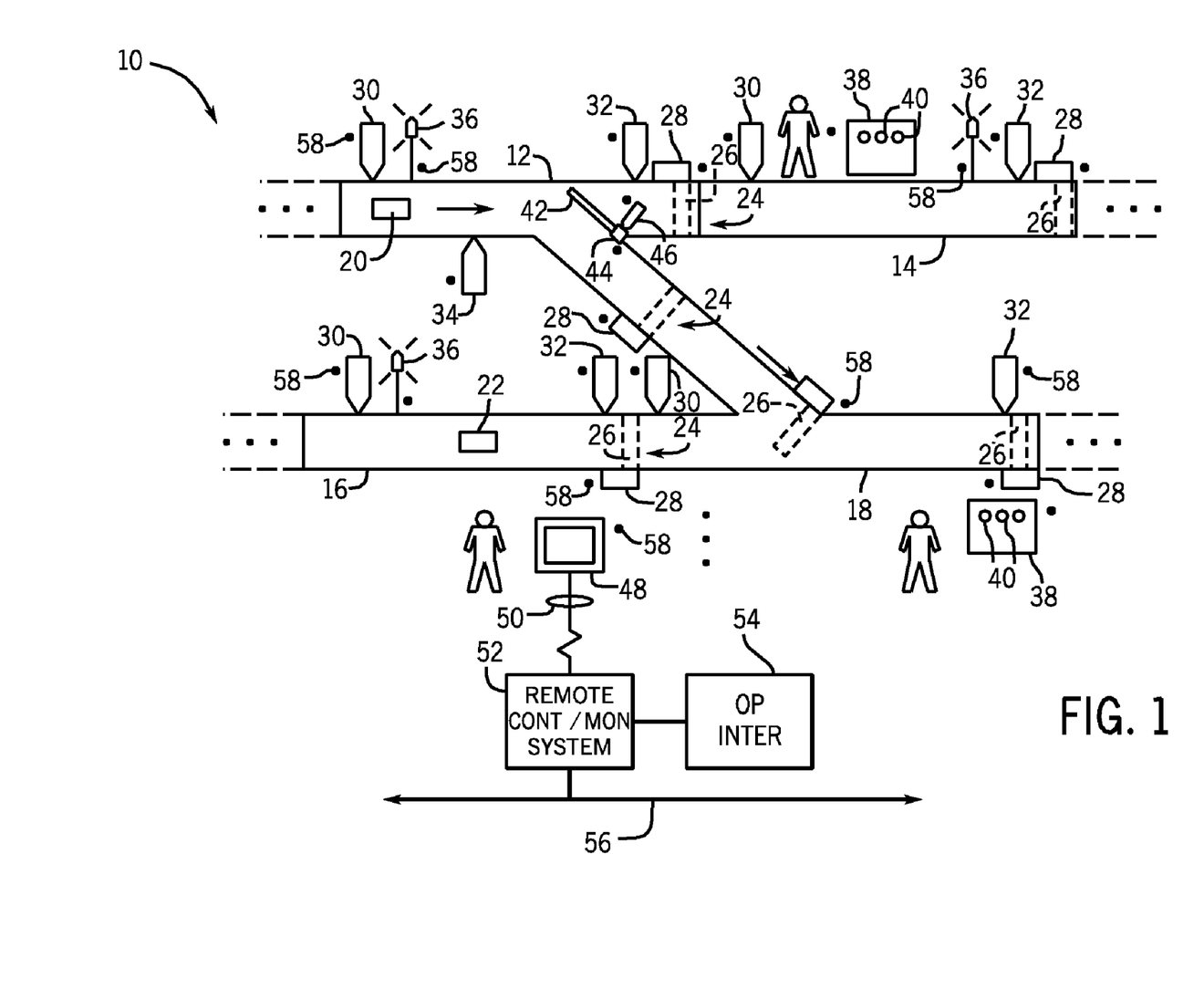
FIG. 1 illustrates an exemplary modular conveyor system employing a wireless mesh communication scheme in accordance with an aspect of the invention.

Referring to FIG. 1, an exemplary modular conveyor system 10 comprises a plurality of conveyor modules configured to communicate with various components over a wireless mesh network. Although four representative conveyor modules 12, 14, 16, and 18 appear in FIG. 1, modular conveyor system 10 may comprise any number of interconnected conveyor modules. Conveyor modules 12 and 16 move materials 20 and 22 forward toward hand off points 24, at which point materials 20 will be handed off to either conveyor module 14 or 18, as appropriate, and materials 22 will be handed off to conveyor module 18. Materials 20 and 22 are moved across a conveyor on each conveyor module by a drive roller 26, which rotates in response to torque signals from a motor controller 28 disposed on each conveyor module.

When materials 20 or 22 cross a hand off point 24 onto conveyor module 14 or 18, an entry sensor 30 may sense the presence of the materials, which may thereafter signal to the prior conveyor module 12 or 16 that materials 20 or 22 have been handed off. Similarly, when materials 20 or 22 approach a hand off point 24 from conveyor module 12 or 16, each may pass an exit sensor 32. The exit sensor 32 may signal to the proximate adjacent conveyor module 14 or 18 that materials 20 or 22 is about to be handed off. Entry sensor 30 and exit sensor 32 may directly communicate over a wireless mesh network to a motor controller 28 of a different conveyor module. However, entry sensor 30 and exit sensor 32 may instead communicate over communication wires to a main motor controller 28 on the same conveyor module, which may thereafter communicate over a wireless mesh network to a motor controller 28 of a different conveyor module.

Conveyor module 12 represents a diverter module, which may divert materials to either conveyor module 14 or 18. Diverter sensor 34 senses information from materials 20, such as a barcode or RFID data, as materials 20 move across conveyor module 12. Communicating wirelessly over a mesh network or over communication wires to the motor controller 28 of module 12, diverter sensor provides the information about materials 20 so that a decision whether to divert materials 20 may be made.

To facilitate human operation of the system, modular conveyor system 10 comprises indicator lights 36 and pushbutton stations 38. Indicator lights 36 may be associated with or attached to a conveyor module, but may also be located elsewhere in the modular conveyor system. If attached to a wireless conveyor module, indicator lights 36 may communicate with other devices over a wireless mesh network directly or via wired communication to a motor controller 28 with access to the wireless mesh network. After receiving a signal over the network regarding the status of a particular conveyor module or the modular conveyor system 10 generally, indicator lights 36 electrify a bulb of particular color, which signals to human operators the status of operation. Pushbutton stations 38 may comprise one or more pushbuttons 40. When a pushbutton 40 is pressed, a pushbutton station 38 may issue a signal across a wireless mesh network comprising, for example, a command or instruction to stop or to resume operation. A given pushbutton station 38 may also be associated with or attached to a particular conveyor module, and may be configured to initiate a self-configuration operation for the associated conveyor module by associating with upline and downline conveyor modules.

Reviewing again conveyor module 12, after diverter sensor 34 obtains information from materials 20 and transmits the data to another device to make a decision whether to divert, a decision signal is sent from the other device to diverter 42. Often, the decision whether to divert requires information external to the conveyor module, and therefore a supervisory system often decides, sending a decision signal after consulting a database. However, a local device, such as motor controller 28 of conveyor module 12 or the diverter sensor 34 itself may comprise sufficient information and circuitry to make the decision to divert. When diverter 42 receives the decision signal, an actuator 44 may move the diverter arm depending on the position of the diverter arm as observed by position sensor 46.

Human operators may track operational status with monitoring station 48. Receiving data from the various components of modular conveyor system 10 over a wireless mesh network, monitoring station 48 alerts human operators to conveyor system status and forwards the data to additional supervisory systems over network 50. Network 50 may represent a local or wide area network, or a virtual private network across the Internet, and may be wired or wireless. Network 50 interconnects monitoring station 48 with a remote control and monitoring system 52. An operator interface 54 connects to remote control and monitoring system 52 and provides remote operation capability to operators that may be located far from the conveyor system floor. Remote control and monitoring system 52 connects to wide area network 56, which may comprise, for example, a company-wide network or the Internet.

To communicate with monitoring station 48 and each other, components of modular conveyor system 10 may comprise mesh communication circuitry 58. The mesh communication circuitry 58 disposed on components of modular conveyor system 10 allow for peer-to-peer communication as well as forming the backbone of an ad hoc wireless mesh network. Although mesh communication circuitry 58 may implement an 802.11x protocol, implementing an 802.15.4 protocol may provide superior power management, despite lower data transmission rates. It should be recognized that wireless meshing in the present context is, however, independent of any particular standard.

Figure 2:
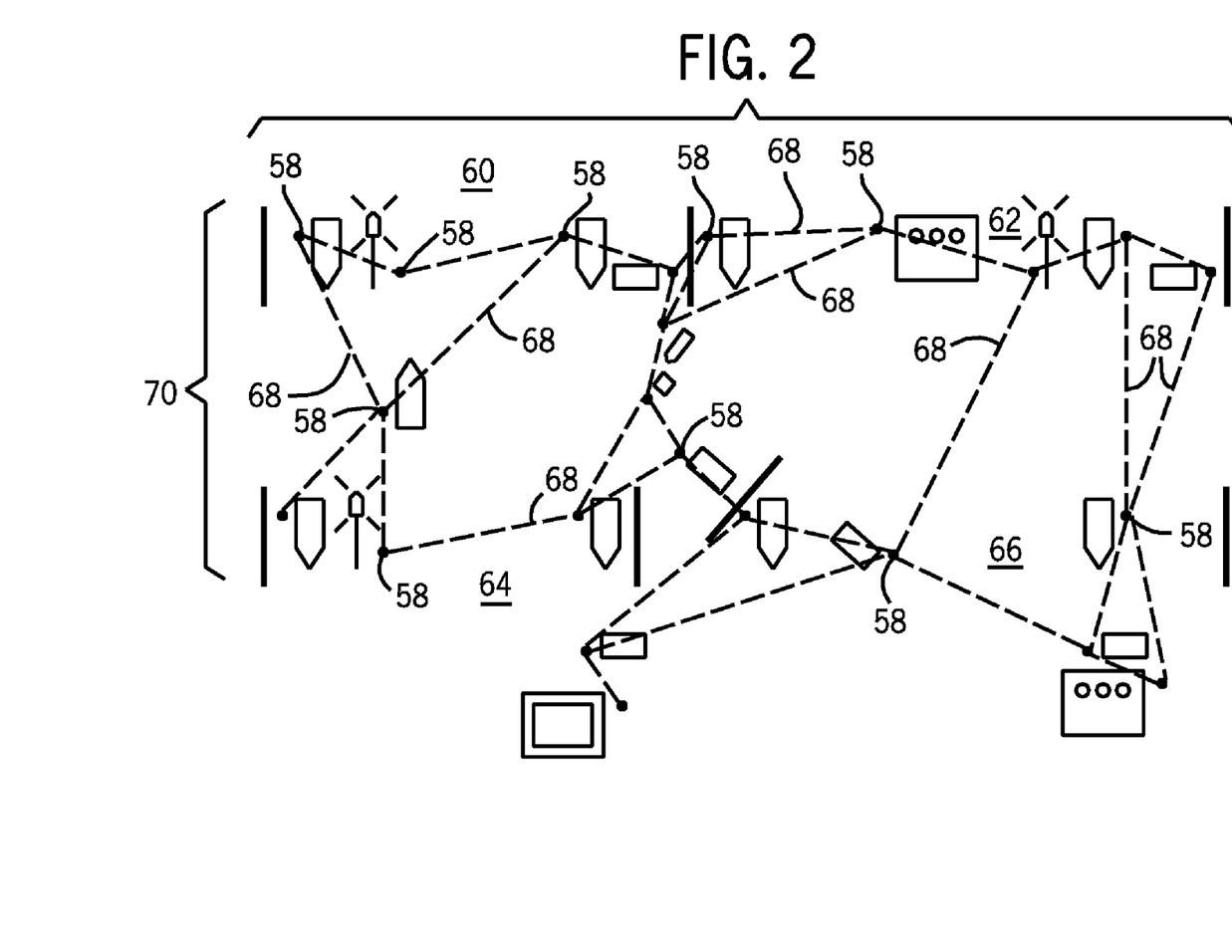
FIG. 2 illustrates communication among wireless mesh communication points of the exemplary conveyor system of FIG. 1.

FIG. 2 illustrates an exemplary wireless mesh network formed by ad hoc wireless interconnections of wireless mesh circuitry 58. First conveyor communication zone 60 represents an exemplary wireless mesh network which may form among components disposed on conveyor 12 (depicted in FIG. 1). Similarly, second conveyor communication zone 62, third conveyor communication zone 64, and fourth conveyor communication zone 66 represent exemplary wireless mesh networks which may form among components disposed on conveyors 14, 16, and 18.

The wireless mesh circuitry 58 of each component forms communication links 68 to the wireless mesh circuitry 58 of adjacent components, composing overall conveyor system mesh 70. A component may communicate with an adjacent component directly over an immediate adjacent communication link 68. Additionally, however, a component may engage in peer-to-peer communication with any other component of the conveyor system 10 by sending a signal over an adjacent communication link 68 for routing through the wireless mesh circuitry 58 of an adjacent component. The wireless mesh circuitry 58 of the adjacent component then routes the communication signal forward over an adjacent communication link 68 to another adjacent component, which subsequently routes the communication signal forward in the same way, until the destination component receives the signal. Accordingly, any component may communicate with any other component of the modular conveyor system 10. Moreover, certain components may also perform only the function of routing, such as for mesh connectivity or redundancy.

Figure 3:
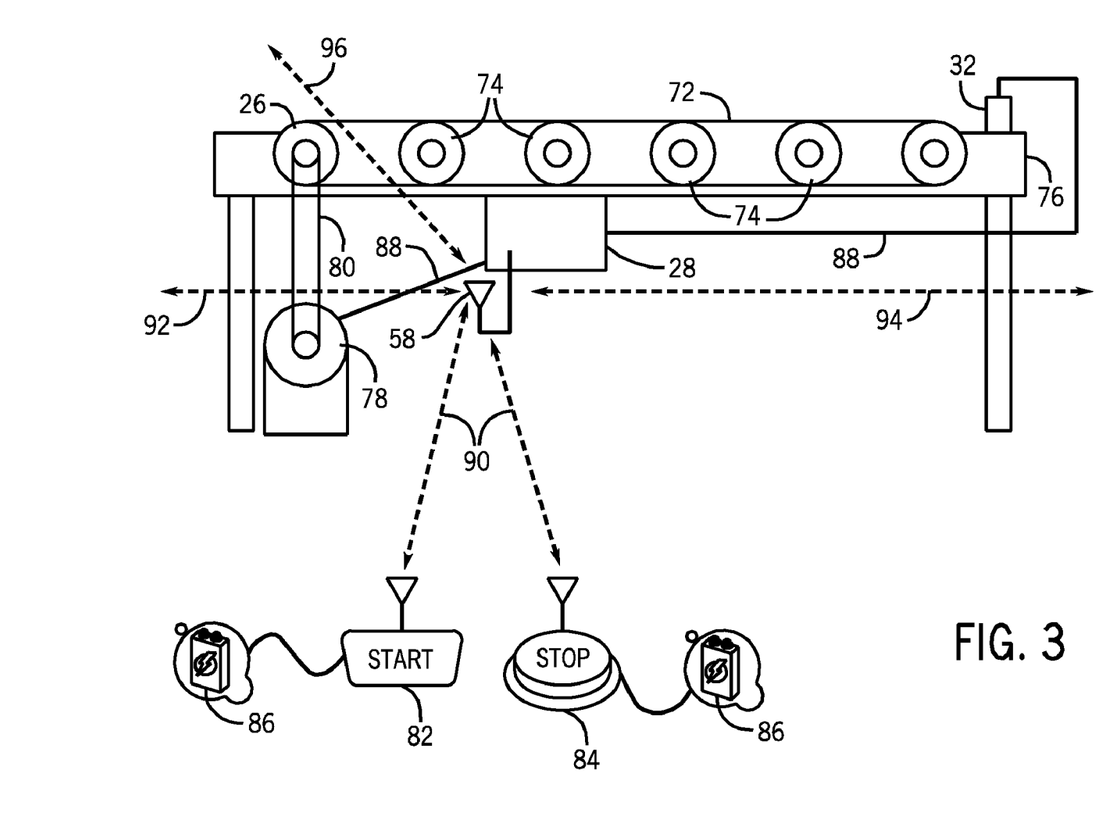
FIG. 3 represents an exemplary modular conveyor system module employing a wireless mesh communication scheme in accordance with an aspect of the invention.

Referring now to FIG. 3, an exemplary conveyor module with wireless mesh communication capability comprises a motor controller 28 with wireless mesh circuitry 58 (represented by an antenna symbol in FIG. 3). A conveyor belt 72 moves across rollers 74, held in place by support structure 76. Motor controller 28 drives a motor 78 which pulls drive link 80, causing drive roller 26 to rotate and move conveyor belt 72. Wireless start button 82 and stop button 84 may be located on a pushbutton station 38. Because start button 82 and stop button 84 each draw power from a battery 86, the pushbutton station 38 may be located remotely from the conveyor module or on the conveyor module by attachment, for example, to support structure 76. It should be noted that, as an alternative to the arrangement shown in FIG. 3, certain conveyors may integrate rollers, motors, drives and so forth in a single unit, and may provide multiple integrated units in certain conveyor modules, each with a wireless interface.

Both exit sensor 32 and motor 78, being permanently attached to the conveyor module, may communicate with the motor controller 28 via a wired communication link 88. By contrast, start button 82 and stop button 84 send control communication 90 wirelessly to motor controller 28 via wireless mesh circuitry 58. Other embodiments, however, may include an alternative wired communication link between the start button 82 and stop button 84 and the motor controller 28.

The motes of each of the components may have push buttons or other similar input means for sending signals for configuration of the network or the devices may be powered up to initiate such signals to begin association with other devices. Sequencing of such initiation may be performed to enable linking of the devices in the desired conveyor application configuration as well as configuring the network for optimal wireless mesh communication between them.

Continuing to refer to FIG. 3, motor controller 28 may conduct a conveyor module association sequence by using wireless mesh circuitry 58 to listen for an upline communication signal 92 from an adjacent upline conveyor module that announces the presence of the upline module. Motor controller 28 may subsequently send a wireless upline communication signal 92 back to the upline conveyor module, announcing the presence of the conveyor module to the upline conveyor module. Accordingly, the conveyor module and the upline conveyor module may exchange association information to become associated with each other.

Similarly, motor controller 28 may continue the conveyor module association sequence by further associating with a downline conveyor module. Using wireless mesh circuitry 58, motor controller 28 listens for a downline communication signal 94 from an adjacent downline conveyor module that announces the presence of the downline module. Motor controller 28 may subsequently send a wireless downline communication signal 94 back to the downline conveyor module, announcing the presence of the conveyor module to the downline conveyor module. After exchanging association information, the conveyor module and the downline conveyor module may thus become associated with each other, as well. Moreover, adjacent sections, upline and downline, of the overall system may communication on a peer-to-peer basis (rather than "multi-hop") in order to minimize the time delay in communications.

Additionally or alternatively, the conveyor module may associate with the wider modular conveyor system 10 by communicating with a supervisory system, such as remote control and operating system 52, via supervisory communication 96 over a wireless mesh network. The supervisory system may subsequently provide the conveyor module with configuration data in a variety of ways.

According to one embodiment, once the wireless mesh network has been established by the wireless mesh circuitry 58 of components of the modular conveyor system 10, motor controller 28 of the conveyor module may communicate with a supervisory system via supervisory communication link 96. The motor controller 28 may send identifying information, such as a serial number of the conveyor module, to the supervisory system. The supervisory system may be preprogrammed with a location of each component of the modular conveyor system, and may then send appropriate association information to motor controller 28 based on the relative location of the conveyor module to other components. Preprogrammed component locations may be stored, for example, in a computer aided design (CAD) map of the modular conveyor system.

According to another embodiment, however, wireless mesh circuitry 58 of components of the modular conveyor system 10 may first determine the relative location of each wireless node formed by each component. After determining its relative location, each component may connect to the supervisory system via supervisory communication link 96 to transmit the location data to the supervisory system. When the supervisory system has obtained the relative location of each component of the modular conveyor system, the supervisory system may determine appropriate association information for each component. Motor controller 28 may subsequently download the appropriate association information from the supervisory system. Accordingly, the association sequence may be greatly simplified as compared to other common techniques.

Figure 4:
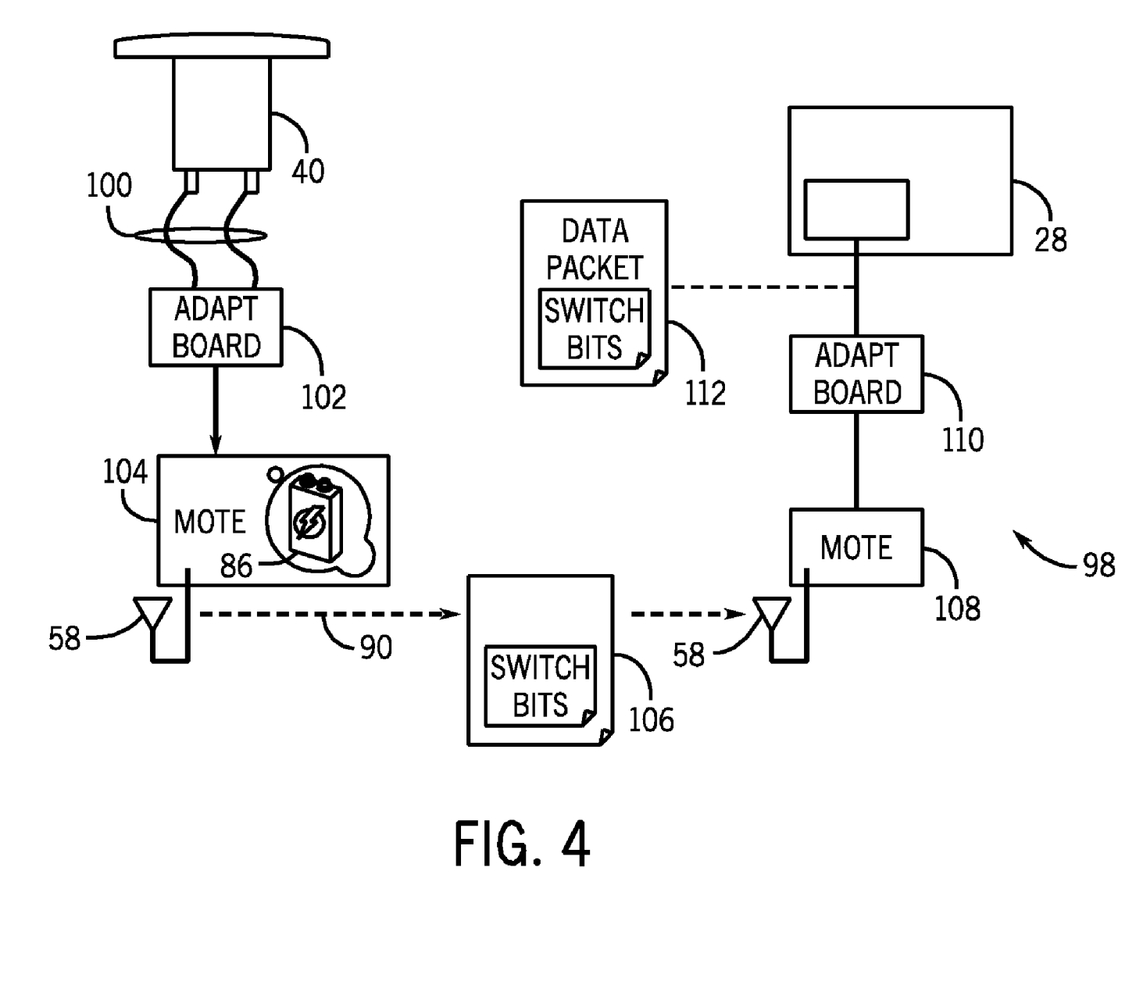
FIG. 4 is a diagrammatical representation of an exemplary pushbutton station for a modular conveyor system communicating wirelessly with a motor controller in accordance with an aspect of the invention.

Turning to FIG. 4, exemplary conveyer module operator control configuration 98 illustrates communication from a pushbutton 40 to a motor controller 28 for controlling a conveyor module. Conveyor module control begins when pushbutton 40 is pressed by a human operator, prompting power links 100 to close a circuit on adapter board 102. Adapter board 102 consequently generates and sends a packet of switch bits based upon push button input status to a mote 104 comprising wireless mesh circuitry 58 and powered by a battery 86. The mote 104 wraps the packet of switch bits using the 802.15.4 wireless protocol and wirelessly transmits the wrapped data packet 106 to another mote 108 having similar wireless mesh circuitry 58. By communicating under the 802.15.4 wireless protocol, power consumption is largely minimized. Accordingly, mote 104 and adapter board 102 may draw power exclusively from battery 86 for an extended period of time of months or even years. It should be noted that the separate adapter boards and motes discussed in the present context may be eliminated as separate components, particularly when the motes are integrated into conveyor application components, such as push button assemblies, motor controllers, and so forth.

When mote 108 receives the wrapped data packet 106 from mote 104, mote 108 unwraps and passes the packet of switch bits to adapter board 110. To render the packet of pushbutton switch bits comprehensible to the motor controller 28, adapter board 110 wraps the packet of switch bits with a modular conveyor system communication protocol before passing the wrapped data packet 112 to motor controller 28. Motor controller 28 may subsequently initiate a control sequence. Alternatively, motor controller 28 may instead enter or exit an active operational state.

Figure 5:
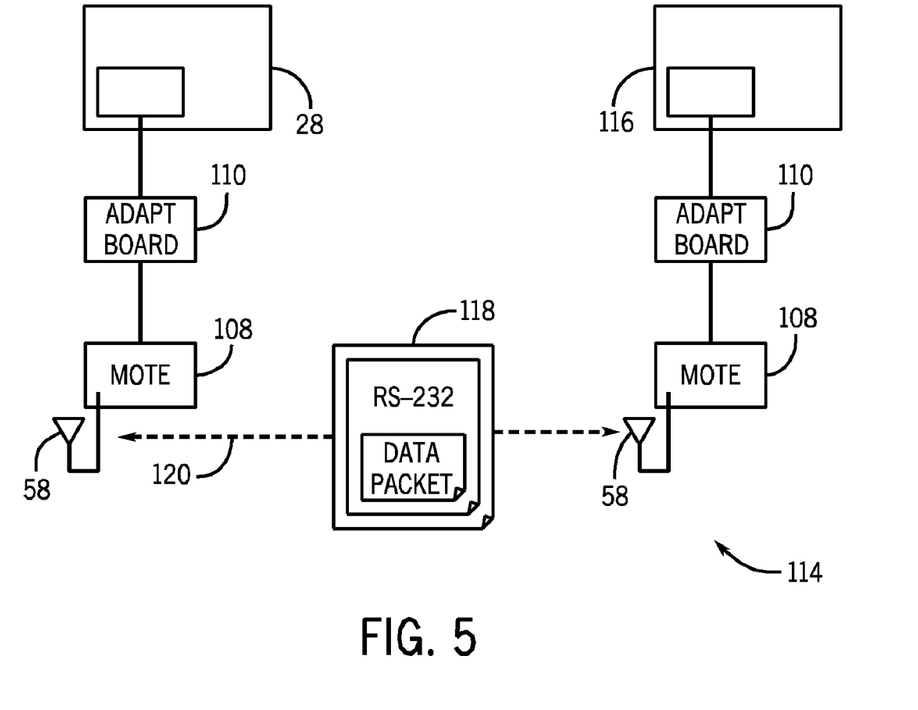
FIG. 5 is a diagrammatical representation of an exemplary motor controller for a modular conveyor system module communicating wirelessly with another motor controller in accordance with an aspect of the invention.

FIG. 5 illustrates peer-to-peer communication 114 between two proximate motor controllers 28 and 116. Motor controller 28 may initiate communication to send a signal to motor controller 116 to indicate, for example, that materials are approaching the handoff point toward the conveyor module to which motor controller 116 belongs. Rather than communicate back and forth through a central gateway, with a wireless mesh motor controller 28 may contact motor controller 116 directly.

Motor controller 28 begins peer-to-peer communication by sending a modular conveyor system communication protocol data packet to an adapter board 110. The adapter board 110 transmits the data packet via an RS-232 or similar serial connection to a mote 108 with wireless mesh circuitry 58. After receiving the serial data packet from adapter board 110, mote 108 wraps the data packet using the 802.15.4 wireless protocol and wirelessly transmits the wrapped data packet 118 over peer-to-peer communication link 120 to another mote 108 having similar wireless mesh circuitry 58. The other mote 108 receives the wrapped data packet 118, unwrapping and transmitting the data packet via an RS-232 or similar serial connection to another adapter board 110. The other adapter board 110 receives the data packet and passes the data to motor controller 116.

Having received a message from motor controller 28, motor controller 116 may react to the message by taking some predefined action, such as driving a motor to activate a conveyor belt in preparation for material handoff. Motor controller 116 may also transmit a return message to motor controller 28 in substantially the same manner as the transmission of the original message.

Figure 6:
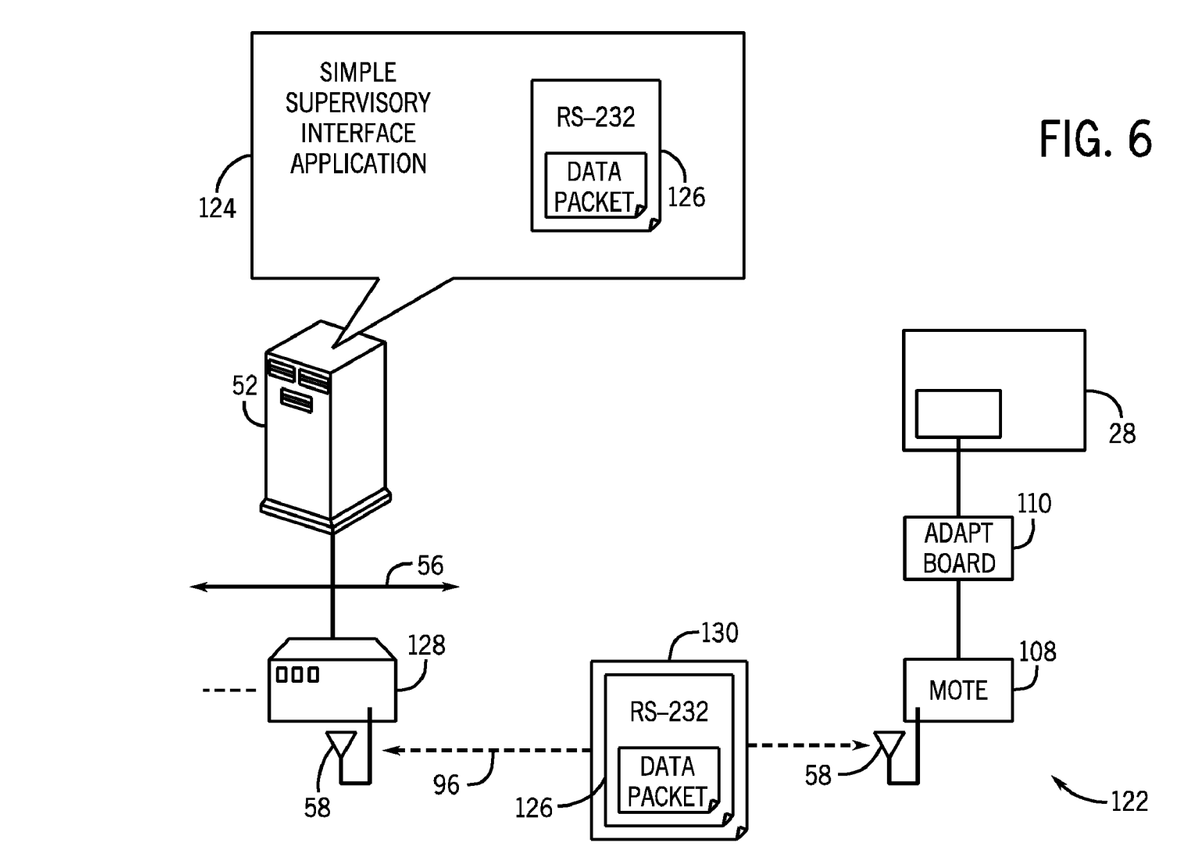
FIG. 6 is a diagrammatical representation of an exemplary supervisory system for a modular conveyor system communicating wirelessly with a motor controller in accordance with an aspect of the invention.

Referring to FIG. 6, gateway communication configuration 122 illustrates one manner by which communication between a motor controller 28 of a conveyor module and a main supervisory system may transpire. To initiate communication, a supervisory system 124 running on a remote control and monitoring system 52 may generate a data packet 126 using a modular conveyor system communication protocol, often in response to direction from a human operator via operation interface 54 (depicted on FIG. 1) or an automated command from network 56. The remote control and monitoring system 52 passes the data packet 126 via an RS-232 or similar serial connection to a gateway 128 with wireless mesh circuitry 58.

Gateway 128 wraps the data packet using the 802.15.4 wireless protocol, wirelessly transmitting the wrapped data packet 130 over supervisory communication link 96 to a mote 108 having similar wireless mesh circuitry 58. Mote 108 receives the wrapped data packet 130 before unwrapping and retransmitting the data packet via an RS-232 or similar serial connection to an adapter board 110. Adapter board 110 receives the data packet and passes the data to motor controller 28.

After receiving the message from supervisory system 124, motor controller 28 may take appropriate action in response to the message. Motor controller 28 may also transmit a return message to supervisory system 124 in substantially the same manner as the transmission of the original message.

Figure 7:
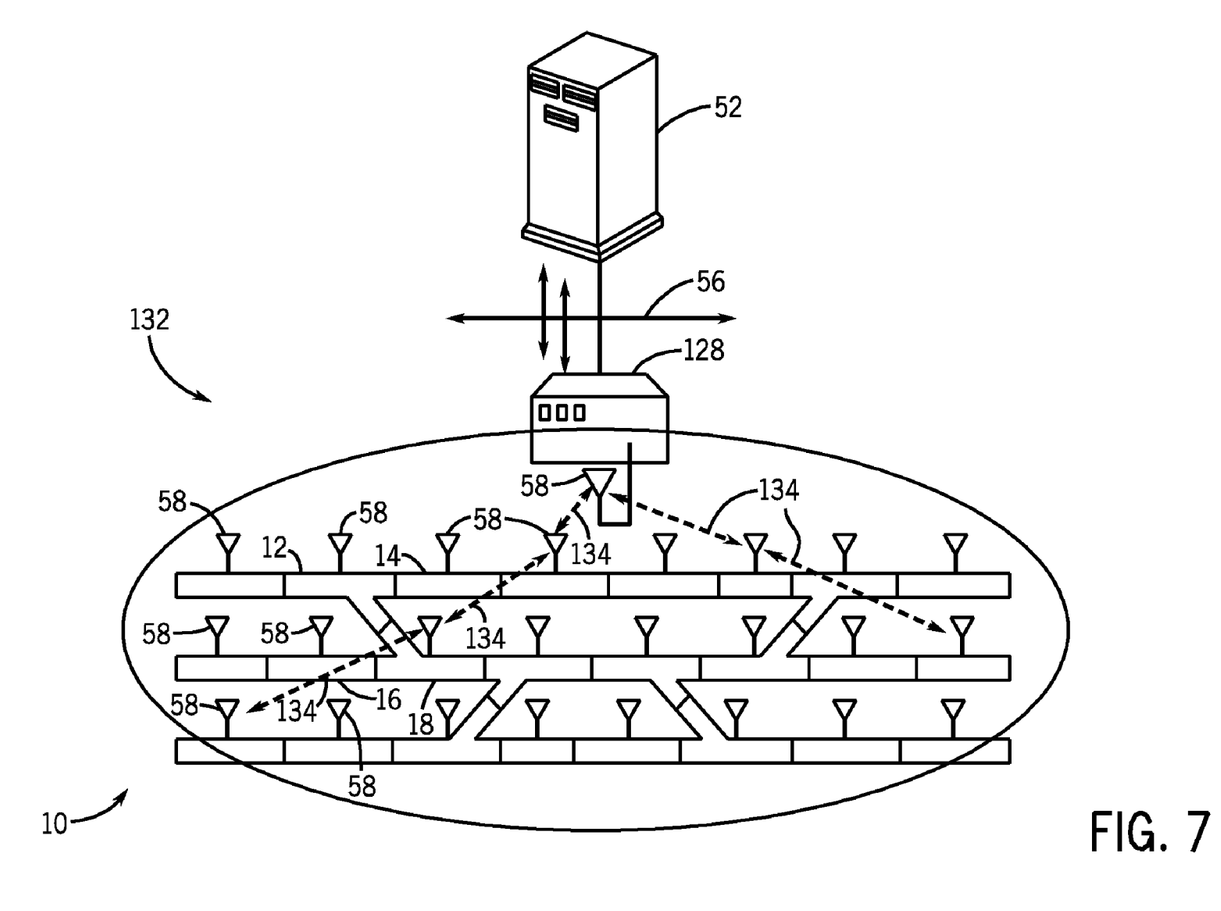
FIG. 7 illustrates a message routed across a modular conveyor system using supervisory mesh routing in accordance with an aspect of the invention.

Appearing on FIG. 7, supervisory mesh routing configuration 132 illustrates supervisory message routing 134 across modular conveyor system 10. When located too great a distance from gateway 128 for direct communication, a conveyor module must send messages to gateway 128 across modular conveyor system 10 components via an ad hoc wireless mesh network. The wireless mesh circuitry 58 of each conveyor module may establish an efficient path for a message to travel, illustrated in FIG. 7 as supervisory message routing 134.

A message sent from a first conveyor module may travel, for example, from the wireless mesh circuitry 58 of the first conveyor module to the wireless mesh circuitry 58 of a proximate module, such as conveyor module 18. From the wireless mesh circuitry 58 of conveyor module 18, the message be forwarded to the wireless mesh circuitry 58 of another proximate conveyor module located more closely to gateway 128. Accordingly, a message may travel a much greater distance across a wireless mesh network than may be possible via a direct communication link alone. Additionally, the power needs of the wireless mesh circuitry 58 may remain comparatively small relative to the power required for a direct communication link.

Figure 8:
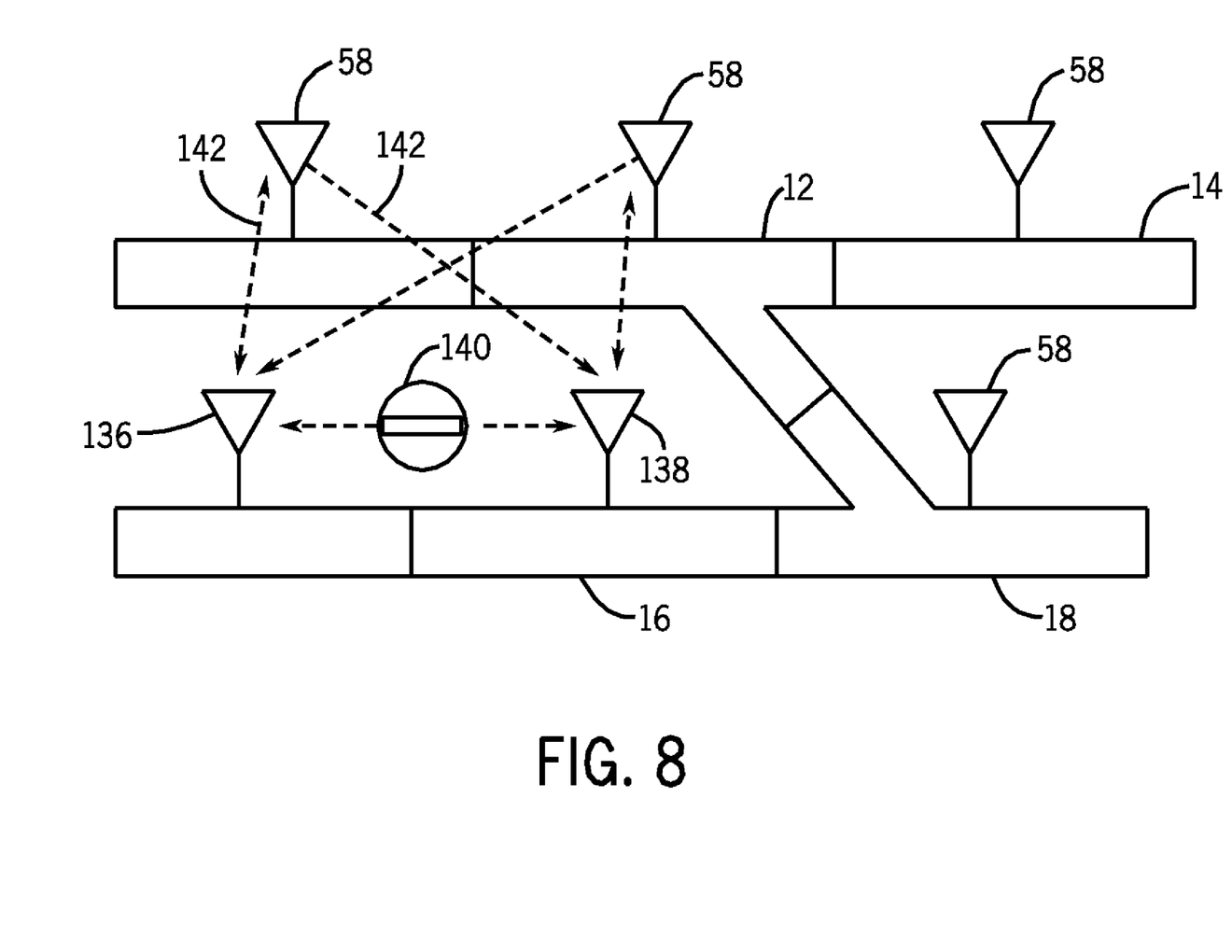
FIG. 8 illustrates alternate mesh routing paths for sending a message when a direct path is obstructed in accordance with an aspect of the invention.

As illustrated in FIG. 8, a modular conveyor system configured for wireless mesh communication may offer additional advantages when a direct link from one component to another becomes obstructed. Operation of a conveyor module with wireless mesh circuitry 136 may require sending a message to conveyor module 16 with wireless mesh circuitry 138, but an obstruction 140 may preclude a direct communication link. An ad hoc wireless mesh network formed by communication links among wireless mesh circuitry 58, 136, and 138, however, may provide a means for traversing the obstruction. Accordingly, despite obstruction 140, a message may take alternate path 142 from wireless mesh circuitry 136 to wireless mesh circuitry 138.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A conveyor module for a modular conveyor system comprising:
   a conveyor;
   at least one motor coupled to the conveyor and configured to move the conveyor;
   at least one motor controller configured to drive the at least one motor; and
   a mote configured to enable the least one motor controller to communicate with another device over a wireless mesh network.

2. The conveyor module of claim 1, further comprising a wireless sensor configured to communicate with another device over the wireless mesh network.

3. The conveyor module of claim 1, wherein the mote is configured to enable the at least one motor controller to communicate over the wireless mesh network with a handheld control device.

4. The conveyor module of claim 1, further comprising a pushbutton station configured to communicate with another device over the wireless mesh network.

5. The conveyor module of claim 4, wherein the pushbutton station comprises a battery and is configured to rely on the battery for power.

6. The conveyor module of claim 1, wherein the mote is configured to enable the at least one motor controller to communicate over the wireless mesh network with a motor controller of an adjacent conveyor module.

7. The conveyor module of claim 6, wherein the mote is configured to communicate via an alternate path over the wireless mesh network for communication with the motor controller of the adjacent conveyor module when a direct path to the motor controller of the adjacent conveyor module is obstructed.

8. A method of configuring a modular conveyor system comprising:

sensing actuation of a mote disposed on or associated with a conveyor module, wherein the mote is configured to communicate over a wireless mesh network;

detecting a signal over the wireless mesh network from an upline conveyor module;

receiving a signal from the upline conveyor module announcing the presence of the upline conveyor module;

sending a signal over the wireless mesh network to the upline conveyor module announcing the presence of the conveyor module;

linking the conveyor modules via the wireless mesh network to operate jointly.

9. The method of claim 8, further comprising detecting a signal over the wireless mesh network from a downline conveyor module, receiving a signal from the downline conveyor module announcing the presence of the downline conveyor module, sending a signal over the wireless mesh network to the downline conveyor module announcing the presence of the conveyor module, and linking the downline conveyor module and the other conveyor modules via the wireless mesh network to operate jointly.

* * * * *